United States Patent [19]

Boyd et al.

[11] 4,134,723
[45] Jan. 16, 1979

[54] COLORATION PROCESS

[75] Inventors: Violet Boyd; Brian R. Fishwick, both of Manchester, England; Brian Glover, Charlotte, N.C.

[73] Assignee: Imperial Chemical Industries Limited, London, England

[21] Appl. No.: 847,492

[22] Filed: Nov. 1, 1977

Related U.S. Application Data

[63] Continuation of Ser. No. 666,246, Mar. 12, 1976, abandoned.

[30] Foreign Application Priority Data

Mar. 25, 1975 [GB] United Kingdom ............... 12423/75

[51] Int. Cl.$^2$ ............................................. C09B 27/00
[52] U.S. Cl. ......................................... 8/41 C; 8/1 A; 8/1 E; 8/21 B; 8/21 C; 8/26
[58] Field of Search ...................... 8/21 C, 21 B, 41 C, 8/1 A, 1 E, 26

[56] References Cited

U.S. PATENT DOCUMENTS

| | | | |
|---|---|---|---|
| 3,869,441 | 3/1975 | Hughes | 8/41 |
| 3,993,438 | 11/1976 | Fishwick et al. | 8/21 C |
| 3,993,441 | 11/1976 | Heinrich et al. | 8/41 C |
| 4,002,425 | 1/1977 | Heinrich et al. | 8/41 C |
| 4,017,256 | 4/1977 | Kogel et al. | 8/21 C |
| 4,065,254 | 12/1977 | Buhler et al. | 8/1 E |

*Primary Examiner*—A. Lionel Clingman
*Attorney, Agent, or Firm*—Cushman, Darby & Cushman

[57] ABSTRACT

A process for the coloration of aromatic polyester textile materials which comprises applying to the said textile materials by an aqueous dyeing, padding or printing process a disperse monoazo dyestuff, free from carboxylic acid and sulphonic acid groups, which, in one of the possible tautomeric forms, is represented by the formula:

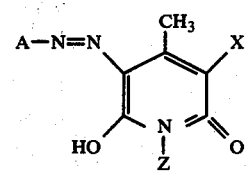

wherein

A is phenyl or phenyl which contains at least one substituent selected from chlorine, bromine, nitro, cyano, trifluoromethyl, thiocyano, lower alkyl, lower alkoxy, lower alkylcarbonyl, lower alkylsulphonyl, lower alkylcarbonylamino, carbamoyl and N-lower alkyl and N:N-di lower alkyl derivatives thereof, sulphamoyl and N-lower alkyl and N:N-di lower alkyl derivatives thereof, sulphamato and N-lower alkyl and N:N-di lower alkyl derivatives thereof, lower alkoxycarbonyl, lower alkoxy lower alkoxycarbonyl, lower alkoxy lower alkoxy lower alkoxycarbonyl, hydroxy lower alkoxycarbonyl, hydroxy lower alkoxy lower alkoxycarbonyl, and lower alkoxycarbonyl lower alkyl.

X is hydrogen, lower alkyl, carbamoyl, cyano, chlorine, bromine, nitroso, nitro, lower alkylcarbonyl, sulphamoyl, lower alkylsulphonyl, lower alkylcarbonylamino or lower alkoxycarbonyl; and Z is hydrogen or lower alkyl;

and subsequently giving the colored textile material a treatment in an aqueous alkaline bath at a pH above 8 and at a temperature between 50° and 85° C, whereby the textile materials are colored in greenish-yellow to red shades possessing excellent fastness properties.

9 Claims, No Drawings

COLORATION PROCESS

This is a continuation of application Ser. No. 666,246 filed Mar. 12, 1976 and now abandoned.

This invention relates to an improved process for the colouration of aromatic polyester textile materials and of unions containing such textile materials.

In the known processes for colouring aromatic polyester textile materials with disperse dyestuffs, an aqueous dispersion of one or more such dyestuffs is applied to the textile material by a dyeing, padding or printing process, the dyestuff being fixed by a simultaneous or subsequent heat treatment. In order that the resulting coloured textile material has the maximum fastness properties it is necessary that any unfixed dyestuff be removed from the surfaces of the fibres present in the textile material, and this is usually achieved by a "reduction clear" treatment (i.e. a treatment in a warm aqueous alkaline solution of sodium hydrosulphite). However the disposal of the liquors from the "reduction clear" treatment causes ecological problems due to the presence of the reducing agent.

It is also well known that aromatic polyester/cellulose unions can be coloured with mixtures of disperse and reactive dyestuffs, but the known processes suffer from the disadvantage that the disperse dyestuffs, in addition to colouring the aromatic polyester part of the union, also stain the cellulose part of the union. In order that the coloured union has the maximum fastness properties it is essential that this staining be removed, but in practice it is found difficult to remove the staining, for example by a "reduction-clear" or "oxidation-clear" treatment, without simultaneously destroying the reactive dyestuff which is attached to the cellulose part of the union. Further in the absence of such a treatment, any dyestuff which is removed by, for example, an ordinary washing treatment, can give rise, particularly in the case of prints, to back staining resulting in staining of other areas of the print, or dull tones. It has now been found that the above difficulties can be overcome by using, as the disperse dyestuff, disperse azo dyestuffs which contain a hydroxy pyridone residue as any staining of the cellulose caused by such dyestuffs can readily be removed by a simple alkaline treatment (i.e. which does not contain a reducing agent) which has no adverse effect on the reactive dyestuff used to dye the cellulose. In addition this treatment removes any unfixed disperse dyestuff from the polyester fibres, and there is little or no tendency for any of the disperse dyestuff so removed to back stain the union.

According to the present invention there is provided an improved process for the colouration of aromatic polyester textile materials which comprises applying to the said textile materials by an aqueous dyeing, padding or printing process a disperse monozao dyestuff, free from carboxylic acid and sulphonic acid groups, which, in one of the possible tautomeric forms, is represented by the formula:

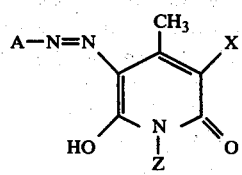

wherein

A is phenyl or phenyl which contains at least one substituent selected from chlorine, bromine, nitro, cyano, trifluoromethyl, thiocyano, lower alkyl, lower alkoxy, lower alkylcarbonyl, lower alkylsulphonyl, lower alkylcarbonylamino, carbamoyl and N-lower alkyl and N:N-di lower alkyl derivatives thereof, sulphamoyl and N-lower alkyl and N:N-di lower alkyl derivatives thereof, sulphamato and N-lower alkyl and N:N-di lower alkyl derivatives thereof, lower alkoxycarbonyl, lower alkoxy lower alkoxycarbonyl, lower alkoxy lower alkoxy lower alkoxycarbonyl, hydroxy lower alkoxycarbonyl, hydroxy lower alkoxy lower alkoxycarbonyl and lower alkoxycarbonyl lower alkyl;

X is hydrogen, lower alkyl, carbamoyl, cyano, chlorine, bromine, nitroso, nitro, lower alkylcarbonyl, sulphamoyl, lower alkylsulphonyl, lower alkylcarbonylamino or lower alkoxycarbonyl; and Z is hydrogen or lower alkyl;

and subsequently giving the coloured textile material a treatment in an aqueous alkaline bath at a pH above 8 and at a temperature between 50° and 85° C.

The dyestuffs used in the process of the invention can exist in a number of possible tautomeric forms. For convenience the dyestuffs have only been formulated in one of the possible forms, but it is to be understood that the Specification includes the use of the dyestuffs in any of the possible tautomeric forms.

Throughout this Specification the terms "lower alkyl" and "lower alkoxy" are used to denote alkyl and alkoxy radicals respectively containing from 1 to 4 carbon atoms.

As examples of the substituents which can be present on the phenyl radical represented by A there may be mentioned lower alkyl such as methyl, lower alkoxy such as methoxy and ethoxy, lower alkylcarbonyl such as acetyl, lower alkylsulphonyl such as ethylsulphonyl, lower alkylcarbonylamino such as acetylamino, N-lower alkyl and N:N-di lower alkylcarbamoyl such as N-ethylcarbamoyl, N-butyl carbamoyl and N:N-dimethylcarbamoyl, N-lower alkyl and N:N-di lower alkyl sulphamoyl such as N-ethylsulphamoyl and N:N-dimethylsulphamoyl, N-lower alkyl and N:N-di lower alkyl sulphamato (—O.SO$_2$NH$_2$) such as N-methylsulphamato and N:N-diethylsulphamato, lower alkoxycarbonyl such as methoxycarbonyl, ethoxycarbonyl, propyloxycarbonyl and butyloxycarbonyl, lower alkoxy lower alkoxycarbonyl such as β-(methoxy- or ethoxy-) ethoxycarbonyl, lower alkoxy lower alkoxy lower alkoxycarbonyl such as β-(β'-methoxyethoxy)ethoxycarbonyl, hydroxy lower alkoxycarbonyl such as β-hydroxyethoxycarbonyl, hydroxy lower alkoxy lower alkoxycarbonyl such as γ-(β'-hydroxyethoxy)-propoxycarbonyl, and lower alkoxycarbonyl lower alkyl such as ethoxycarbonyl methyl.

As examples of lower alkyl represented by X and Z there may be mentioned ethyl and methyl. As examples of lower alkylcarbonyl represented by X there may be mentioned acetyl and propionyl, as examples of lower alkoxycarbonyl represented by X there may be mentioned methoxycarbonyl, ethoxycarbonyl, propoxycarbonyl and butoxycarbonyl, as an example of lower alkylsulphonyl represented by X there may be mentioned ethylsulphonyl, and as an example of lower alkylcarbonylamino represented by X there may be mentioned acetylamino.

The process of the invention may be conveniently carried out by immersing the aromatic polyester textile material in a dyebath comprising an aqueous dispersion of a disperse monoazo dyestuff as hereinbefore defined, the dispersion being established, if desired, by dispersing agents, cationic dispersing agents and anionic dispersing agents or a mixture of two or more such dispersing agents. Dyeing is then carried out at the temperature usually employed for the aromatic polyester textile material; thus the dyeing process can either be carried out at a temperature between 90° and 100° C., preferably in the presence of a carrier such as diphenyl or o-hydroxydiphenyl, or at a temperature above 100° C. preferably at a temperature between 120° and 140° C. under superatmospheric pressure, when a carrier is not usually necessary.

Alternatively an aqueous dispersion of the disperse monoazo dyestuff can be padded onto the synthetic textile material, and the dyestuff is fixed on the textile material by steaming it for short periods at temperatures between 100° and 180° C. or by baking it at temperatures between 160° and 220° C. If desired the padding liquor can contain the conventional additives, for example dispersing agents, thickeners, migration inhibitors, or urea.

As a further alternative a thickened printing paste containing the disperse monoazo dyestuff in dispersed form can be applied to the surface of the synthetic textile materials by any of the methods conventionally use for applying printing pests to synthetic textile materials, for example by block, screen or roller printing. The printed textile material, optionally after being dried, is then steamed for short periods at temperatures between 100° and 180° C., or is baked at temperatures between 160° and 220° C. Suitable thickening agents which are present in the printing paste include gum tragacanth, gum arabic, alginates, or oil-in-water or water-in-oil emulsions. The printing pastes can also contain conventional additives such as urea and sodium m-nitrobenzene sulphonate.

The coloured aromatic polyester material is then optionally rinsed in water and is then given a treatment in a hot aqueous alkaline solution having a pH of at least 8.0 and preferably having a pH in the range of 10.0 to 13.5, more particularly 10 to 11.5 The temperature of the said alkaline solution is preferably in the range of 60° to 80° C., higher temperatures generally being used at the lower pH's and vice-versa, and the time of treatment will vary on the depth of shade which has been applied to the union and the type of equipment which is being used, however the times are usually in the range of 30 seconds to 30 minutes. If desired the said alkaline solution can also contain a small amount (for example 0.2 to 1.0%) of a synthetic detergent. After the alkaline treatment the union is rinsed in water, optionally containing a synthetic detergent, and is then dried.

The said alkaline solutions are prepared from alkaline agents such as ammonia or ammonium salts or organic amines such as triethanolamine, but preferred alkaline agents are carbonates or hydroxides of alkali metals such as lithium, potassium and sodium.

Although the invention is described with reference to the use of a single disperse monoazo dyestuff, as hereinbefore defined, in many cases in order to obtain the required shades, it is necessary to use a mixture of the said disperse monoazo dyestuffs. Further in order to obtain a wide variety of shades it is frequently necessary to apply the said disperse monoazo dyestuffs in conjunction with other disperse dyestuffs which can be applied by a similar process. Disperse dyestuffs which can be applied in a similar manner are those disperse dyestuffs, preferably of the aminoazobenzene series, which contain at least two carboxylic acid ester groups.

The process of the present invention can also be applied to the colouration of unions containing aromatic polyester fibres and cellulose or polyamide fibres, the disperse monoazo dyestuff, as hereinbefore defined, being applied in conjunction with a suitable dyestuff for the cellulose or polyamide fibres, for example a Direct Dyestuff, an Acid Dyestuff, a Reactive Dyestuff, a Sulphur Dyestuff or a Vat Dyestuff, the coloured union being given a treatment in an aqueous alkaline bath at a pH above 8 and at a temperature between 50° and 85° C. Preferably the union is an aromatic polyester/cellulose union and the dyestuff, or dyestuffs, for the cellulose fibres present is a Reactive Dyestuff.

According to a further feature of the present invention there is provided an improved process for the colouration of aromatic polyester/cellulose unions which comprises applying to the said unions a reactive dyestuff and a disperse monoazo dyestuff as hereinbefore defined, fixing the dyestuffs on the union, and thereafter subjecting the coloured union to a treatment in an aqueous alkaline bath at a pH above 8.0 and at a temperature between 50° and 85° C.

The said disperse monoazo dyestuff and the reactive dyestuff can be applied in separate steps in either order but are preferably applied together.

Whilst this process is applicable to the batchwise dyeing of the said unions, it is preferably carried out in a continuous manner.

Thus this process of the invention can be conveniently carried out by continuously padding or printing the union with a padding liquor or print paste containing the said disperse monoazo dyestuff, the reactive dyestuff and an alkaline agent. The padded or printed union is then preferably dried and is then subjected to a heat treatment to fix the dyestuffs on the union. This heat treatment can for example comprise treatment with superheated steam or in steam either at atmospheric pressure or under pressure, or a baking treatment in hot air at temperatures in the region of 150° to 230° C., or by passing the union over a heated surface for example over a calendar at 150° to 230° C. At the conclusion of the heat treatment the union is optionally rinsed in water and is then given a treatment in the aqueous alkaline bath as hereinbefore defined.

In addition to the dyestuffs, the padding liquors or print pastes can contain any of the adjuvants which are conventionally employed in such liquors or pastes, for example thickening agents, migration inhibitors, cationic, anionic or non-ionic dispersing agents, urea, humectants, solubilising agents, bacteriodides, sequestering agents, wetting agents, emulsifiers, oxidising agents such as sodium chlorate or sodium m-nitrobenzene sulphonate, fixation accelerators such as diphenyl and derivatives thereof or polyethylene oxide adducts known as carriers or fixation accelerators, or antifoam agents such as organic derivatives of silicon. The said padding liquors or print pastes can be slightly acidic or neutral but are preferably slightly alkaline which can be achieved by incorporating therein a small amount, up to 20% by weight, of an alkaline agent such as sodium bicarbonate or sodium carbonate. Alternatively the print pastes or padding liquors can contain a substance, such as sodium trichloroacetate, which on heating or steaming liberates an alkaline agent.

When the said padding liquors or print pastes are slightly acidic or neutral then it is usually necessary to subsequently treat the padded or printed union with an alkali in order to obtain satisfactory fixation of the reactive dyestuff. This treatment with an alkali can be carried out before, but is preferably carried out after the fixation of the disperse dyestuff. However in the case of certain classes of reactive dyestuffs, for example those containing a 4-chloro-6-hydroxy-1:3:5-triazin-2-ylamino group, fixation of such dyestuffs following application from neutral or acidic medium can be effected by a heat treatment without the use of alkali.

When the dyestuffs are separately applied then this process of the invention can for example be conveniently carried out by padding or printing the said union with a padding liquor or print paste containing the disperse monoazo dyestuff, drying, heating or steaming the union to effect fixation of the disperse monoazo dyestuff, padding or printing the union with a padding liquor or print paste containing a reactive dyestuff and an alkali, fixing the reactive dyestuff by heating or steaming or, in the case of highly reactive dyestuffs, batching the union in a moist state. The union is then, optionally after rinsing in water, given a treatment in a hot aqueous solution of an alkaline agent at a pH above 8.0. If desired in this method of carrying out the process of the invention the dyestuffs can be applied in the reverse order.

When the reactive dyestuff is fixed by an alkaline shock treatment involving the use of a high concentration of an alkali as the last stage is applying both dyestuffs to the union, then when the union is subsequently given a rinse in water to remove the excess alkali the resulting alkaline solution can itself act as the aqueous alkaline bath, as hereinbefore defined, so that a separate treatment in such a bath may not be necessary.

The aromatic polyester/cellulose unions used in the process of the invention can be any textile materials which are mixtures of aromatic polyester fibres and cellulose fibres. Such unions are usually in the form of knitted, or preferably woven goods. The percentage of aromatic polyester fibres is usually in the range of 20 to 95%, and preferably 30 to 85%, by weight of the weight of the union. The aromatic polyester fibres are preferably polyethylene terephthalate fibres, and the cellulose fibres are preferably cotton, linen, viscose rayon or polynosic rayon fibres.

Although the invention is described with reference to the padding liquor or print paste containing a disperse monoazo dyestuff and a reactive dyestuff, in many cases, in order to obtain the required shades, it is necessary to use a mixture of the said disperse monoazo dyestuffs and/or a mixture of the reactive dyestuffs, and the use of such mixtures is within the scope of the invention. Preferably the disperse monoazo dyestuffs, or mixture thereof, and the reactive dyestuff, or mixture thereof, are so chosen that the polyester fibres and the cellulose fibres present in the union are coloured to substantially the same shade.

The disperse monoazo dyestuffs used in the process of the invention can themselves be obtained by coupling a diazo compound derived from an amine of the formula A—NH₂ with a coupling component of the formula:

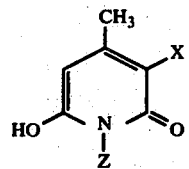

wherein A, X and Z have the meanings stated above, the coupling being carried out under aqueous alkaline conditions, the amine and coupling component being free from sulphonic acid and carboxylic acid groups.

As examples of the amines of the formula A—NH₂ there may be mentioned aniline, o-, m- or p-toluidine, o-, m- or p-anisidine, o-, m- or p-chloroaniline, o-, m- or p-bromoaniline, o-, m- or p-nitroaniline, 2:5-dichloroaniline, 2:4-dinitroaniline, 2:4-dinitro-6-(chloro or bromo)aniline, 4-methanesulphonylaniline, 4-aminobenzotrifluoride, 4- or 5-nitro-2-toluidine, 4- or 5-nitro-2-anisidine, 4- or 5-chloro-2-anisidine, 4- or 6 chloro-2-toluidine, 4- or 5-bromo-2-anisidine, 2:6-di(-chloro- or bromo)-4-nitroaniline, 2:4:6-trinitroaniline, 2:3 dinitro-6-carbomethoxyaniline, 2-amino-5-nitrobenzotrifluoride, 2:4-bis(methansulphonyl)aniline, 2-(chloro-or bromo)-4-nitroaniline, methylanthranilate, 4- or 5-nitromethylanthranilate, 4-aminobenzamide, 2:6-di(chloro- or bromo-)-aniline-4-sulphonamide, 2:6-di(-chloro- or bromo)-4-methylsulphonylaniline, 2:5-di(-chloro- or bromo-)-4:6-dinitro-aniline, 2-amino-3:5-dinitrobenzotrifluoride, 3-amino-2-(chloro- or bromo-)-4:6-dinitro-(toluene or anisole), 3-amino-4-(chloro- or bromo-)-2:6-dinitro-(toluene or anisole), 2- or 4-cyanoaniline, 4-nitro-2-cyanoaniline, 2:4-dinitro-6-cyanoaniline, 2-nitro-4-cyanoaniline, 2-chloro-4-cyanoaniline, 3-amino-2:4:6-trinitrotoluene, 2-(chloro- or bromo-)-4-methylsulphonylaniline, 3-(chloro- or bromo-)-4-thiocyanatoaniline, 2-(chloro- or bromo-)-4-sulphamylaniline, 2-amino-5-nitrophenylmethanesulphone, 2-amino-3:5-dinitrophenylmethylsulphone, 2-amino-3-(chloro- or bromo-)-5-nitrophenylmethylsulphone, 2-sulphamyl-4-nitroaniline, 2-methylsulphamyl-4-nitroaniline, 2-ethylsulphamyl-4-nitroaniline, 2-butylsulphamyl-4-nitroaniline, 2-dimethylsulphamyl-4-nitroaniline, 2-methylsulphamyl-4:6-initroaniline, 2-methylsulphamyl-4-nitro-6-(chloro- or bromo-)aniline, 2-butylsulphamyl-4-nitroaniline, methyl 2-amino-3-(chloro- or bromo-)-5-nitro-benzoate, dimethyl 2-aminoterephthalate, dimethyl 2-amino-5-nitroterephthalate aniline -2-, 3- or 4-sulphamate and aniline-2-, 3- or 4-N:N-dimethylsulphamate.

As specific examples of the said coupling components there may be mentioned 1:4-dimethyl-6-hydroxypyrid-2-one, 3-(cyano-, carbamoyl- or methoxycarbonyl-)-4-methyl-2:6-dihydroxypyridine and 1-(methyl, ethyl, n-propyl or n-butyl-)-3-(cyano, carbamoyl, acetyl, methoxycarbonyl or ethoxycarbonyl)-4-methyl-6-hydroxypyrid-2-one.

A preferred class of the disperse monoazo dyestuffs for use in the invention comprises the dyestuffs of the formula:

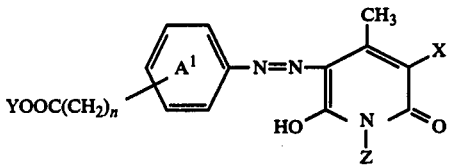

wherein X and Z have the meanings stated, n is 0 or 1, Y is lower alkyl, lower alkoxy lower alkyl, lower alkoxy lower alkoxy lower alkyl, hydroxy lower alkyl or hydroxy lower alkoxy lower alkyl, and the benzene ring $A^1$ can be further substituted by chlorine, bromine, nitro, lower alkoxycarbonyl, lower alkyl or lower alkoxy. Preferably Y is lower alkyl, n is 0, and X is —CN.

The reactive dyestuffs used in this process of the invention can be any water-soluble dyestuffs which contain at least one fibre-reactive group this being defined as a group whose presence in the dyestuff molecule renders the dyestuff capable of chemically combining with hydroxy groups present in cellulose textile materials so that the dyestuff molecule becomes attached to the cellulose molecule through a covalent chemical bond or bonds. Each fibre-reactive group is attached to a carbon atom present in the dyestuff molecule and preferably to a carbon atom of an aromatic ring, preferably a benzene ring, present in the dyestuff molecule. The said dyestuffs are preferably dyestuffs of the azo, including monoazo and polyazo and metallised azo dyes, anthraquinone, formazan, triphendioxazine, nitro and phthalocyanine series containing at least one fibre-reactive group.

As examples of fibre-reactive groups there may be mentioned acylamino radicals derived from olefinically unsaturated aliphatic carboxylic acids such as acryloylamino and crotonylamino, or from halogen-substituted aliphatic carboxylic acids such as β-chloropropionylamino, β-bromopropionylamino, β-γ:γ-trichlorocrotonylamino and tetrafluorocyclobutylacryloylamino. Alternatively the fibre-reactive group can be a vinyl sulphone, β-chloroethylsulphonyl, β-sulphatoethylsulphonyl, β-chloroethylsulphonamide or an optionally N substituted β-aminoethylsulphonyl group.

The fibre-reactive group is preferably a heterocyclic radical having two or three nitrogen atoms in the heterocyclic ring and at least one labile substituent attached to a carbon atom of the heterocyclic ring. As examples of labile substituents there may be mentioned chlorine, bromine, fluorine, quaternary ammonium groups, thiocyano, sulphonic acid, hydrocarbylsulphonyl groups, groups of the formula

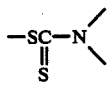

wherein the nitrogen atom carries optionally substituted hydrocarbon or heterocyclic radicals, and groups of the formula:

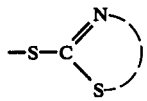

wherein the dotted line indicates the atoms necessary to form an optionally substituted or fused heterocyclic ring.

As specific examples of such fibre-reactive heterocyclic radicals there may be mentioned 3:6-dichloropyridazine-4-carbonylamino, 2:3-dichloroquinoxaline -5- or 6- (sulphonyl or carbonyl) amino, 2:4-dichloroquinazoline-6- or 7-sulphonylamino, 2:4:6-trichloroquinazoline-7- or 8- sulphonylamino, 2:4:7-trichloroquinazoline-6-sulphonylamino, 2:4-dichloroquinazoline-6-carbonylamino, 1:4-dichlorophthalazine-6-carbonylamino, 4:5-dichloropyridazon-1-ylamino, 2:4-dichloropyrimid-5-ylcarbonylamino, 1-(phenyl-4'-carbonylamino)-4:5-dichloropyridazone, 1-(phenyl-4'-sulphonylamino)-4:5-dichloropyridazone, 2:4- and/or 2:6- dichloro- or bromo- pyrid-6- (and/or -4)ylamino, difluorochloropyrimidylamino, trichloropyrimidylamino, tribromopyrimidylamino, dichloro-5-(cyano, nitro, methyl or carbomethoxy)-pyrimidylamino, 2-methylsulphonyl-6-chloropyrimid-4-ylcarbonylamino and 5-chloro-6-methyl-2-methylsulphonylpyrimid-4-ylamino, and more particularly 1:3:5-triazin-2-ylamino radicals which contain a fluorine or a bromine and, above all, a chlorine atom on at least one of the 4- and 6- positions, for example 4:6-dichloro-1:3:5-triazin-2-ylamino. When the triazine nucleus contains only a single halogen atom, preferably a chlorine atom, then the third carbon atom of the triazine ring can be substituted by a hydrocarbon radical, such as methyl or phenyl, but more particularly by an optionally substituted hydroxy, mercapto or amino group, such as methoxy, phenoxy, α-and β-naphthoxy, methylmercapto, phenylthio, methylamino, diethylamino, cyclohexylamino and anilino and N-alkylanilino and substituted derivatives thereof such as anisidino, toluidino, carboxyanilino, sulphoanilino, disulphoanilino and sulphonated naphthylamino.

Thus, a preferred class of the reactive dyestuffs comprises those dyestuffs which contain as the fibre-reactive group a group of the formula:

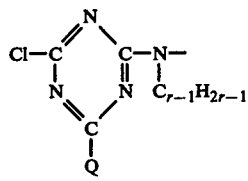

wherein r is 1 or 2, and Q is a chlorine atom, an optionally substituted amino group or an etherified hydroxyl group.

The optionally substituted amino groups represented by Q are preferably optionally substituted alkylamino, anilino, or N-alkylanilino groups, e.g. methylamino, ethylamino, β-hydroxyethylamino, di-(β-hydroxyethyl)amino, β-methoxyethylamino, β-sulphatoethylamino, anilino, o-, m- and p- sulphoanilino, 4- and 5-sulpho-2-carboxyanilino, 4- and 5-sulpho-2-methoxyanilino, 4- and 5-sulpho-2-methylanilino, 4- and 5-sulpho-2-chloroanilino, 4- and 5-sulpho -2-chloroanilino, 2,4- 2,5- and 3,5- disulphoanilino, N-methyl-m- and p- sulphoanilino.

If desired the fibre-reactive group can be of the type:

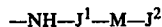

wherein $J^1$ is a pyrimidine or triazine ring optionally carrying a labile substituent, $J^2$ is a pyrimidine or triazine ring carrying at least one labile substituent and M is a bridging member which is linked to $J^1$ and $J^2$ through optionally substituted imino groups, said imino groups being linked together through an alkylene or arylene radical such as ethylene, 1:4-phenylene or 2-sulpho-1:4-phenylene.

Other linking groups of particular interest represented by M are the divalent radicals of stilbene, diphenyl, diphenyloxide, diphenylamine, diphenylurea, diphenoxyethane and diphenylamino-s-triazine, which contain a sulphonic acid group in each benzene nucleus.

It is preferred that $J^1$ and $J^2$ should each represent a chloro-s-triazine group. Thus, a further class of reactive dyestuffs comprises those dyestuffs which contain as the fibre-reactive group a group of the formula:

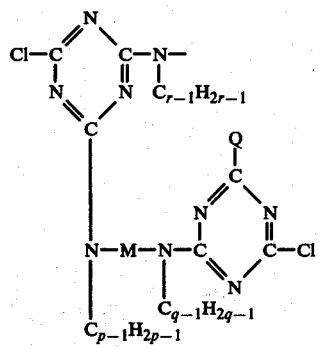
(7)

wherein r, p and q are each independently 1 or 2, and M and Q have the meaning stated above.

The group Q, as previously defined, includes within its scope groups which contain a chromophoric system linked to the carbon atom of the triazine ring through —NH— or —O—.

Such reactive dyestuffs can be obtained in conventional manner, for example by reacting a water-soluble dyestuff containing a primary or secondary amino group with a compound which contains the said fibre-reactive group. As examples of such compounds there may be mentioned acryloyl chloride, cyanuric chloride, 2:4:6-trichloropyrimidine, 2:4:6-trichloro-5-(cyano- or chloro-) pyrimidine and 6-methoxy-2:4-dichloro-1:3:5-triazine.

The other classes of dyestuffs which are present when the process of the present invention is applied to unions (e.g. Vat Dyestuffs, Acid Dyestuffs) are described in, for example, the Third Edition of the Colour Index which was published in 1971.

By the process of the present invention aromatic polyester textile materials can be coloured in greenish-yellow to red shades possessing excellent fastness to light, to wet treatments and to dry heat treatments, whilst aromatic polyester/cellulose unions are coloured in a wide variety of shades which have excellent fastness to the tests commonly applied to such unions and there is excellent reserve of the white unprinted portions of such unions.

The invention is illustrated but not limited by the following Examples in which the parts and percentages are by weight.

EXAMPLE 1

100 Parts of a woven aromatic polyester textile material are immersed in a dyebath comprising a dispersion of 1 part of 1-ethyl 3-cyano-4-methyl-5-phenylazo-6-hydroxypyrid-2-one in 3000 parts of water containing 1 part of oleyl sodium sulphate. The dyebath is then heated to 130° C. during 30 minutes and maintained at this temperature for a further hour under superatmospheric pressure. The dyed textile material is then removed from the dyebath, rinsed in water, immersed for 15 minutes in an aqueous solution 80° C. containing 0.2% of sodium hydroxide and 0.1% of a non-ionic detergent. The textile material is again rinsed in water and is finally dried.

The aromatic polyester textile material is thereby dyed a greenish-yellow shade possessing excellent fastness to light, to wet treatments and to dry heat treatments.

EXAMPLE 2

In place of the 1-part of the dyestuff used in Example 1 there is used 1 part of 1-ethyl-3-cyano-4-methyl-5-(p-methoxycarbonylphenylazo)-6-hydroxypyrid-2-one or 1 part of 1-ethyl-3-cyano-4-methyl-5-[p-($\beta$-($\beta'$-methoxyethoxy)ethoxycarbonyl)phenylazo]-6-hydroxypyrid-2-one when similar results are obtained.

EXAMPLE 3

A dispersion of 40 parts of 1-ethyl-3-cyano-4-methyl-5-[p-($\beta$-($\beta'$-methoxyethoxy)ethoxycarbonyl)-phenylazo]-6-hydroxypyrid-2-one in 200 parts of water containing 20 parts of the disodium salt of bis(2-sulphonaphth-1-yl)methane is added to a mixture comprising:

| | |
|---|---|
| 10% aqueous solution of sodium alginate | 500 parts |
| Aqueous emulsion of sulphonated sperm oil and pine oil | 20 parts |
| Urea | 100 parts |
| Sodium bicarbonate | 10 parts |
| Dyestuff of Example 409 of British Specification No. 1271226 | 20 parts |
| Water to a total of | 1000 parts | and the resulting print paste is printed onto a woven 67:33 "Terylene"/cotton textile material ("Terylene" is a Registered Trade Mark), and the textile material dried. The textile material is then steamed for 6 minutes at 170° C. at atmospheric pressure. The textile material is then rinsed in water, treated for 10 minutes at 85° C. in an aqueous solution containing 0.2% of sodium carbonate and 0.2% of non-ionic detergent at a liquor ratio of 50:1, rinsed again in water and finally dried.

The textile material is thereby printed in a yellow shade having excellent reserve on the white unprinted portions, and the print has excellent fastness to wet treatments.

In place of the 0.2% of sodium carbonate used in the washing liquor there is used 0.2% of sodium hydroxide when a similar result is obtained.

In place of the 1 part of sodium bicarbonate used in the above Examples there are used 3 parts of sodium trichloroacetate when a similar result is obtained.

Instead of steaming the printed textile material for 6 minutes 170° C., the printed textile material is baked for 1 minute at 200° C. or subjected for 20 minutes to steam at a pressure of 1.4 Kg/cm$^2$ when similar results are obtained.

EXAMPLE 4

A dispersion of 40 parts of 1-ethyl-3-cyano-4-methyl-5-[p-($\beta$-($\beta'$-methoxyethoxy)ethoxycarbonyl)- phenylazo]-6-hydroxypyrid-2-one in 200 parts of water containing 20 parts of the disodium salt of bis(2-sulphonaphth-1-yl)methane is added to a mixture comprising 500 parts of a 10% aqueous solution of sodium alginate, 20 parts of an aqueous emulsion of sulphonated sperm oil and pine oil and 100 parts of urea, and water is then added to give a total of 100 parts.

The resulting print paste is printed onto a woven aromatic polyester textile material and the textile material is dried. The textile material is steamed for 6 minutes at 170° C. at atmospheric pressure, rinsed in water, treated for 10 minutes at 85° C. in an 0.2% aqueous solution of sodium hydroxide, rinsed again in water, and finally dried.

A greenish-yellow print of excellent fastness properties is obtained.

In place of the disperse dyestuffs used in any of Examples 1 to 4 there are used equivalent amounts of the disperse dyestuffs which are obtained by diazotising the amines listing in the second column of the Table and coupling the resulting diazo compound with the coupling components listed in the third column of the Table whereby the aromatic polyester textile materials or fibres are coloured in greenish-yellow to orange shades.

| Example | Amine | Coupling Component |
| --- | --- | --- |
| 5 | 3-methoxycarbonylaniline | 1:4-dimethyl-3-cyano-6-hydroxy-pyrid-2-one |
| 6 | 2-methoxycarbonylaniline | " |
| 7 | 4-ethoxycarbonylaniline | " |
| 8 | 4-n-propoxycarbonylaniline | " |
| 9 | 3-n-butoxycarbonylaniline | " |
| 10 | 4-(β-hydroxyethoxycarbonyl)aniline | " |
| 11 | 4-(β-ethoxyethoxycarbonyl)aniline | " |
| 12 | 4-[β-(β'-hydroxyethoxy)ethoxycarbonyl]aniline | " |
| 13 | 3:4-di(methoxycarbonyl)aniline | " |
| 14 | 2:5-di(methoxycarbonyl)aniline | " |
| 15 | 3:5-di(methoxycarbonyl)aniline | " |
| 16 | 2-chloro-4-methoxycarbonyl aniline | " |
| 17 | 2-methoxycarbonyl-4-bromo-aniline | " |
| 18 | 2-nitro-4-methoxycarbonyl-aniline | " |
| 19 | 2-methyl-5-methoxycarbonyl-aniline | " |
| 20 | 2-methoxy-5-methoxycarbonyl-aniline | " |
| 21 | 4-[β-(methoxycarbonyl)ethyl]aniline | 1:4-dimethyl-3-cyano-6-hydroxy-pyrid 2-one |
| 22 | 4-methoxycarbonylaniline | 3-cyano-4-methyl-2:6-dihydroxy-pyridine |
| 23 | " | 1-n-butyl-3-cyano-4-methyl-6-hydroxypyrid-2-one |
| 24 | " | 1-ethyl-4-methyl-6-hydroxy-pyrid-2-one |
| 25 | " | 1-ethyl-3:4-dimethyl-6-hydroxy-pyrid-2-one |
| 26 | " | 1-ethyl-3-carbamoyl-4-methyl-6-hydroxypyrid-2-one |
| 27 | " | 1-ethyl-3-chloro-4-methyl-6-hydroxypyrid-2-one |
| 28 | " | 1-ethyl-3-bromo-4-methyl-6-hydroxypyrid-2-one |
| 29 | " | 1-ethyl-3-nitroso-4-methyl-6-hydroxypyrid-2-one |
| 30 | " | 1-ethyl-3-nitro-4-methyl-6-hydroxypyrid-2-one |
| 31 | " | 1-ethyl-3-acetyl-4-methyl-6-hydroxypyrid-2-one |
| 32 | " | 1-ethyl-3-sulphamoyl-4-methyl-6-hydroxypyrid-2-one |
| 33 | " | 1-ethyl-3-methylsulphonyl-4-methyl-6-hydroxypyrid-2-one |
| 34 | " | 1-ethyl-3-N-methylcarbamoyl-4-methyl-6-hydroxypyrid-2-one |
| 35 | " | 1-ethyl-3-methoxycarbonyl-4-methyl-6-hydroxypyrid-2-one |
| 36 | 4-cyanoaniline | 1:4-dimethyl-3-cyano-6-hydroxy-pyrid-2-one |
| 37 | 2-trifluoromethyl-4-nitroaniline | " |
| 38 | 2:6-dichloro-4-thio cyanoaniline | " |
| 39 | 4-acetylaniline | " |
| 40 | 4-aminobenzaldehyde | " |
| 41 | 4-methylsulphonyl aniline | " |
| 42 | 4-acetylaminoaniline | " |
| 43 | 4-carbamoylaniline | " |
| 44 | 4-(N-methylcarbamoyl)aniline | " |
| 45 | 4-(N:N-dimethylcarbamoyl)aniline | 1:4-dimethyl-3-cyano-6-hydroxy-pyrid-2-one |

-continued

| Example | Amine | Coupling Component |
|---|---|---|
| 46 | 4-sulphamoylaniline | " |
| 47 | 4-(N-methylsulphamoyl)aniline | " |
| 48 | 4-(N:N-dimethylsulphamoyl)aniline | " |
| 49 | 3-(aminosulphonyloxy)aniline | " |
| 50 | 3-(N:N-dimethylaminosulphonyloxy)aniline | " |

What we claim is:

1. A process for the colouration of aromatic polyester/cellulose or aromatic polyester/polyamide union textile materials which comprises applying to the said textile materials, by an aqueous dyeing, padding or printing process, (1) a disperse monoazo dyestuff, free from carboxylic acid and sulphonic acid groups, which, in one of the possible tautomeric forms, is represented by the formula:

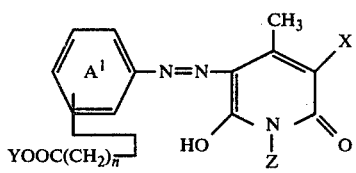

wherein
n is 0 or 1, Y is lower alkyl, lower alkoxy lower alkyl, lower alkoxy lower alkoxy lower alkyl, hydroxy layer alkyl or hydroxy lower alkoxy lower alkyl, and the remaining positions of the benzene ring $A^1$ are bonded to hydrogen chlorine, bromine, nitro, lower alkoxycarbonyl, lower alkyl or lower alkoxy, X is hydrogen, lower alkyl, carbamoyl, cyano, chlorine, bromine, nitroso, nitro, lower alkylcarbonyl, sulphamoyl, lower alkylsulphonyl, lower alkylcarbonylamino or lower alkoxycarbonyl; and Z is hydrogen or lower alkyl;

and (2) a dyestuff to colour the cellulose or polyamide fibers, and subsequently giving the coloured textilel material a treatment in an aqueous alkaline bath which does not contain a reducing agent, at a pH above 8 and at a temperature between 50° and 85° C.

2. A process as claimed in claim 1 wherein the aqueous alkaline bath having a pH above 8 additionally contains from 0.2 to 1.0% by weight, based on the weight of the bath, of a synthetic detergent.

3. Process as claimed in claim 1 wherein the said disperse monoazo dyestuff is applied in conjunction with a disperse dyestuff of the aminoazobenzene series which contains at least two carboxylic acid ester groups.

4. Process as claimed in claim 1 wherein the textile material is an aromatic polyester/cellulose union, and a Reactive Dyestuff is used to colour the cellulose fibres present in the union.

5. Process as claimed in claim 4 wherein the disperse dyestuff, and the Reactive Dyestuff are applied together.

6. Process as claimed in claim 4 herein the colouration of the textile material is carried out in a continuous manner by a printing or padding process.

7. Process as claimed in claim 1 wherein the Reactive Dyestuff contains a 1:3:5-triazin-2-ylamino group having a chlorine atom attached to one or both of the carbon atoms in the 4- and 6-positions of the triazine ring.

8. Process as claimed in claim 1 wherein Y is lower alkyl, n is 0, and X is —CN.

9. Aromatic polyester textile materials whenever coloured by a process as claimed in claim 1.

* * * * *